United States Patent
Son et al.

(10) Patent No.: US 10,770,237 B2
(45) Date of Patent: Sep. 8, 2020

(54) MULTILAYER ELECTRONIC COMPONENT

(71) Applicant: SAMSUNG ELECTRO-MECHANICS CO., LTD., Suwon-si, Gyeonggi-do (KR)

(72) Inventors: Soo Hwan Son, Suwon-Si (KR); Jae Yeol Choi, Suwon-si (KR); Young Ghyu Ahn, Suwon-si (KR)

(73) Assignee: SAMSUNG ELECTRO-MECHANICS CO., LTD., Suwon-si, Gyeonggi-do (KR)

(*) Notice: Subject to any disclaimer, the term of this patent is extended or adjusted under 35 U.S.C. 154(b) by 12 days.

(21) Appl. No.: 15/954,140

(22) Filed: Apr. 16, 2018

(65) Prior Publication Data

US 2019/0198252 A1 Jun. 27, 2019

(30) Foreign Application Priority Data

Dec. 21, 2017 (KR) .................. 10-2017-0177465

(51) Int. Cl.
*H01G 4/38* (2006.01)
*H01G 4/30* (2006.01)
*H01G 4/232* (2006.01)
*H01G 4/12* (2006.01)

(52) U.S. Cl.
CPC ............ *H01G 4/385* (2013.01); *H01G 4/232* (2013.01); *H01G 4/30* (2013.01); *H01G 4/1227* (2013.01)

(58) Field of Classification Search
CPC .......... H01G 4/228; H01G 4/232; H01G 4/38; H01G 4/385
See application file for complete search history.

(56) References Cited

U.S. PATENT DOCUMENTS

| 7,057,878 | B2 | 6/2006 | Vierow et al. | |
|---|---|---|---|---|
| 2006/0264317 | A1* | 11/2006 | Banno | B32B 18/00 501/138 |
| 2010/0118467 | A1* | 5/2010 | Takeuchi | H01G 4/232 361/306.3 |
| 2010/0243307 | A1* | 9/2010 | McConnell | H01G 4/232 174/260 |
| 2012/0188681 | A1* | 7/2012 | Togashi | H01G 4/012 361/301.4 |
| 2014/0043723 | A1 | 2/2014 | Hattori et al. | |

(Continued)

FOREIGN PATENT DOCUMENTS

| JP | 04188813 A * | 7/1992 |
|---|---|---|
| KR | 10-1485106 B1 | 1/2015 |

(Continued)

*Primary Examiner* — Eric W Thomas
(74) *Attorney, Agent, or Firm* — Morgan, Lewis & Bockius LLP

(57) ABSTRACT

A multilayer electronic component includes: a laminate having a plurality of multilayer capacitors are disposed to be adjacent to each other, each of the multilayer capacitors including a body including dielectric layers and first and second internal electrodes alternately exposed through two end surfaces of the body facing each other in a length direction with each of the dielectric layers interposed therebetween, and first and second external electrodes disposed on the two end surfaces of the body in the length direction, respectively; and first and second terminals disposed on the laminate to cover a plurality of first and second external electrodes, respectively.

14 Claims, 12 Drawing Sheets

(56) References Cited

U.S. PATENT DOCUMENTS

2016/0104577 A1\* 4/2016 Cho ............... H01G 4/012
                                                       361/301.4
2016/0225525 A1\* 8/2016 Mizuno ............ H01G 4/30

FOREIGN PATENT DOCUMENTS

KR       10-1702398 B1    2/2017
WO      WO-02052591 A2 \*   7/2002  ........... H10G 4/385

\* cited by examiner

I - I'

US 10,770,237 B2

MULTILAYER ELECTRONIC COMPONENT

CROSS-REFERENCE TO RELATED APPLICATION(S)

This application is based on and claims the benefit of priority to Korean Patent Application No. 10-2017-0177465 filed on Dec. 21, 2017 in the Korean Intellectual Property Office, the entire disclosure of which is incorporated herein by reference.

TECHNICAL FIELD

The present disclosure relates to a multilayer electronic component.

BACKGROUND

In recent years, demand for a multilayer capacitor having high voltage and high capacitance has increased.

However, when a large-sized multilayer capacitor having a high capacitance is manufactured as a thin ceramic sheet, since uniformity of a sheet and internal electrodes may be deteriorated, and it may be difficult to remove a binder in plasticization, these problems may cause a defect rate of a final product to be increased and capacitance dispersion to be widened.

Thus, a technique in which yield and capacitance desired by a user are capable of being implemented without manufacturing a multilayer capacitor having a large size has been demanded.

SUMMARY

An aspect of the present disclosure may provide a multilayer electronic component having a high capacity in which a plurality of small multilayer capacitors are connected to each other to increase capacity.

According to an aspect of the present disclosure, a multilayer electronic component may include: a laminate having a plurality of multilayer capacitors are disposed to be adjacent to each other, each of the plurality of multilayer capacitors including a body including dielectric layers and first and second internal electrodes alternately exposed through two end surfaces of the body facing each other in a length direction with each of the dielectric layers interposed therebetween, and first and second external electrodes disposed on the two end surfaces of the body in the length direction, respectively; and first and second terminals disposed on the laminate to cover a plurality of first and second external electrodes, respectively.

The laminate may include the plurality of multilayer capacitors arranged in parallel in a horizontal direction.

The laminate may include the plurality of multilayer capacitors stacked in a vertical direction.

The laminate may be formed by disposing the plurality of multilayer capacitors in parallel with each other in a horizontal direction while stacking the plurality of multilayer capacitors in a vertical direction.

A first multilayer capacitor disposed on a lowermost layer of the laminate may have lower capacitance than a second multilayer capacitor disposed on an upper side of the laminate.

A first body of a first multilayer capacitor disposed on a lowermost layer of the laminate may be formed of a material having a dielectric constant smaller than that of a second body of a second multilayer capacitor disposed on an upper side of the laminate.

A first body of a first multilayer capacitor disposed on a lowermost layer of the laminate may be configured so that the number of stacked internal electrodes in the first body is smaller than that of a second body of a second multilayer capacitor disposed on an upper side of the laminate.

$30 \times t \leq C1 \leq 100 \times t$ in which t is a thickness of each of the dielectric layers, and C1 is the sum of thicknesses of two adjacent cover regions of two adjacent multilayer capacitors of the laminate, wherein each of the two adjacent multilayer capacitors includes two cover regions disposed on upper and lower sides thereof.

Each of the first and second terminals may include first and second connection portions formed on two end surfaces of the laminate in the length direction, and first and second band portions extending from circumferential edges of the first and second connection portions to cover a portion of top and bottom surfaces of the laminate in a thickness direction and a portion of front and rear surfaces of the laminate in a width direction, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
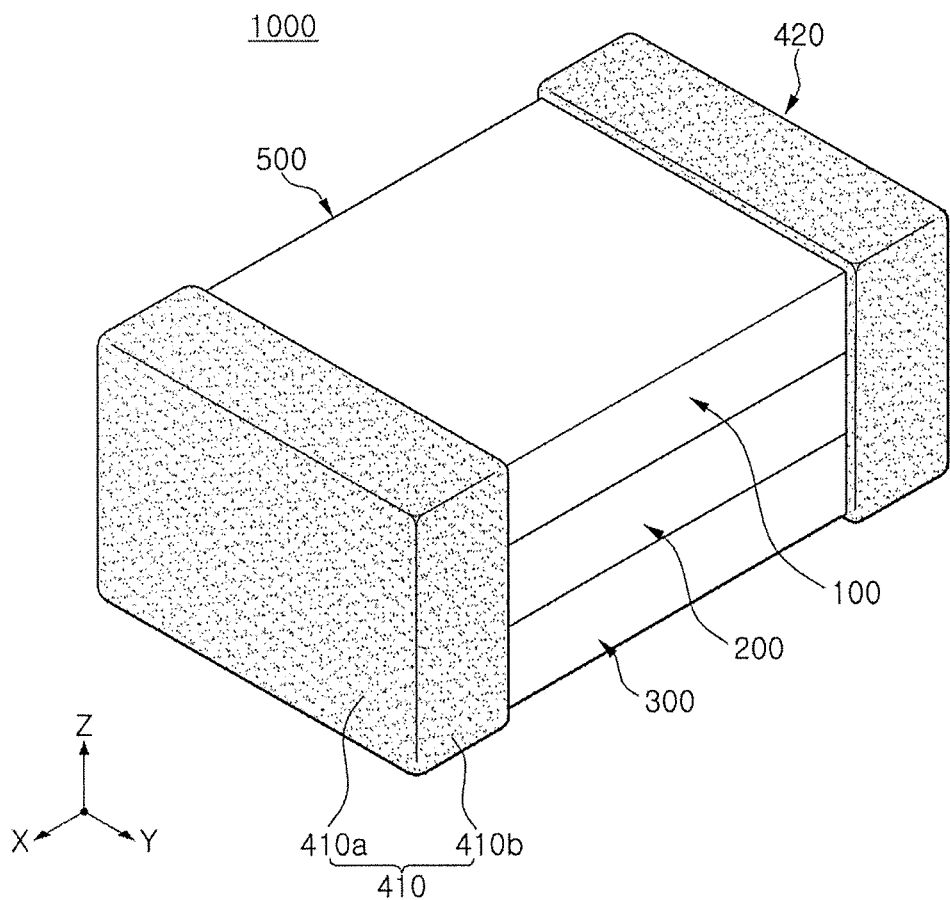
FIG. 1 is a perspective view schematically illustrating a multilayer electronic component according to an exemplary embodiment in the present disclosure.

Hereinafter, exemplary embodiments of the present disclosure will be described in detail with reference to the accompanying drawings.

Directions of a multilayer electronic component will be defined in order to clearly describe exemplary embodiments of the present disclosure. X, Y and Z shown in the drawings refer to a length direction, a width direction, and a thickness direction, respectively. Here, the thickness direction may be the same as a direction in which dielectric layers are stacked in a multilayer capacitor.

Figure 2:
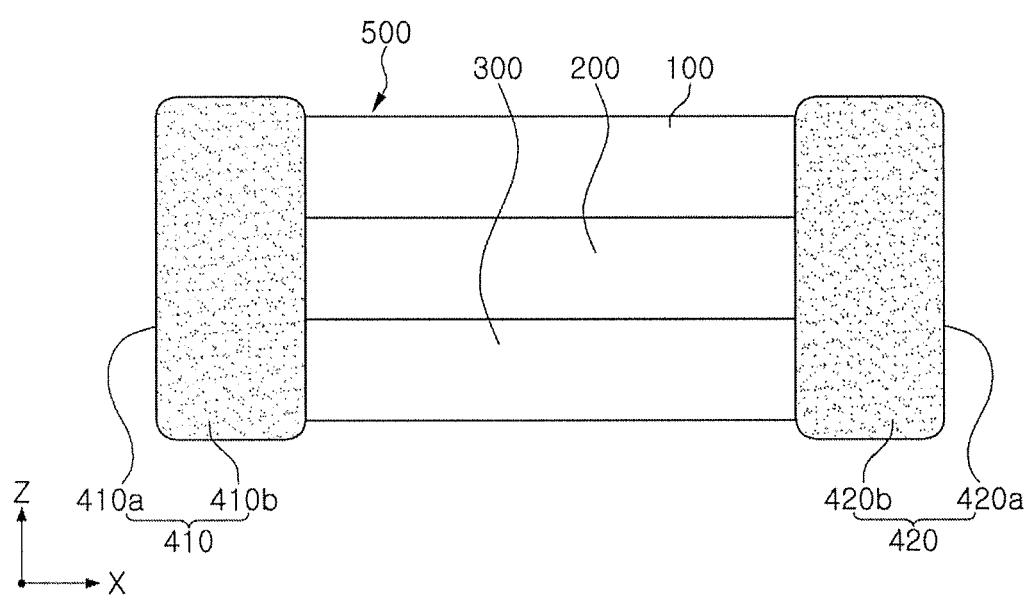
FIG. 2 is a front view of FIG. 1.

FIG. 1 is a perspective view schematically illustrating a multilayer electronic component according to an exemplary embodiment in the present disclosure; and FIG. 2 is a front view of FIG. 1.

Referring to FIGS. 1 and 2, the multilayer electronic component 1000 according to an exemplary embodiment in the present disclosure may include a laminate 500 in which a plurality of multilayer capacitors 100, 200, and 300 are disposed to be adjacent to each other, and first and second terminals 410 and 420.

First, the multilayer capacitor configuring the laminate 500 will be described. Here, since a first multilayer capacitor 100 disposed on an uppermost layer of the laminate 500 has a similar configuration to second and third multilayer capacitors 200 and 300 disposed on a middle layer and a lowermost layer, respectively, the following description is provided based on the first multilayer capacitor 100, but is considered to include descriptions of the second and third multilayer capacitors 200 and 300.

Figure 3:
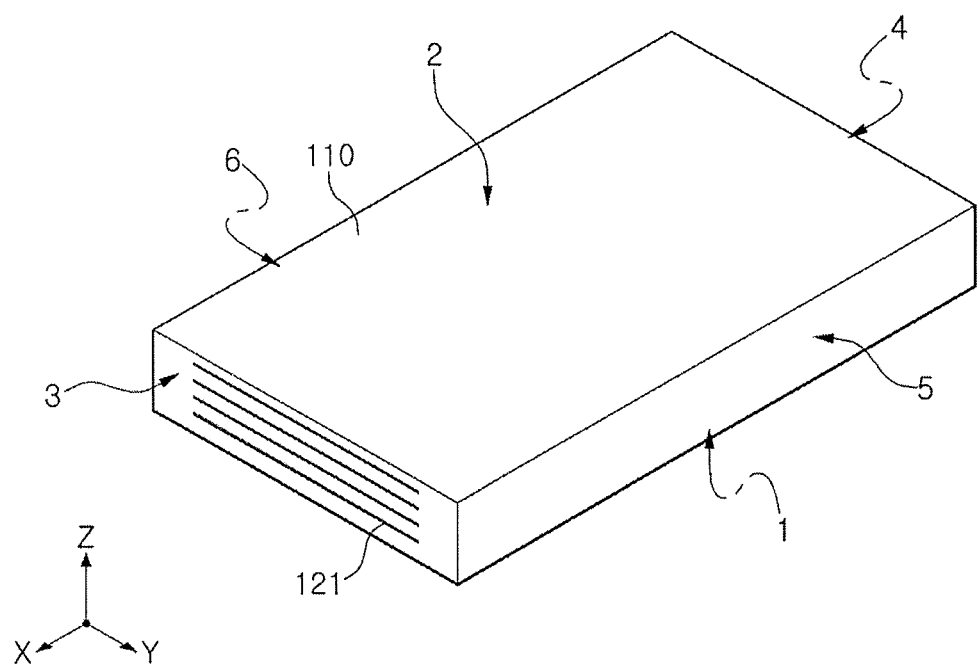
FIG. 3 is a perspective view schematically illustrating a body of a first multilayer capacitor configuring the laminate of FIG. 1.
Figure 4:
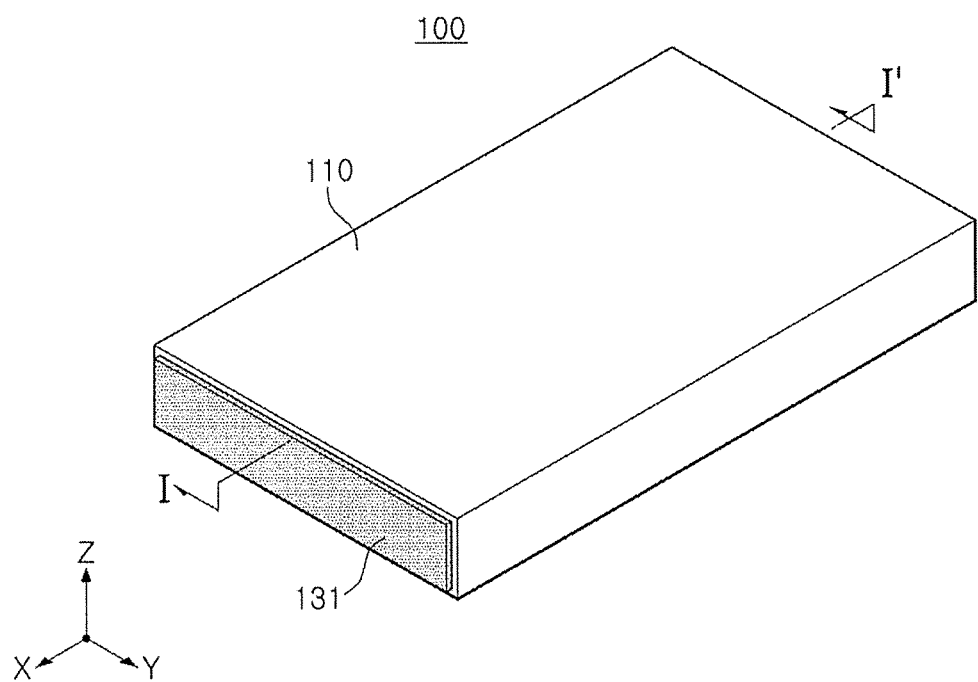
FIG. 4 is a perspective view schematically illustrating formation of external electrodes on the body of FIG. 3.
Figure 5:
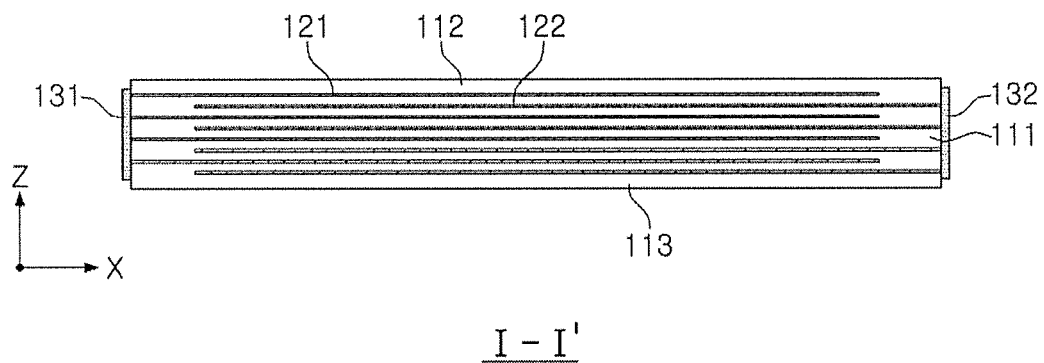
FIG. 5 is a cross-sectional view taken along line I-I' of FIG. 4.
Figure 6A:
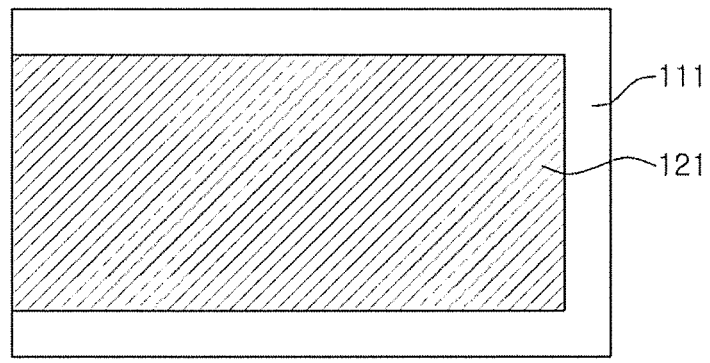
FIGS. 6A and 6B are plan views illustrating structures of the first and second internal electrodes included in the body of FIG. 3, respectively.
Figure 6B:
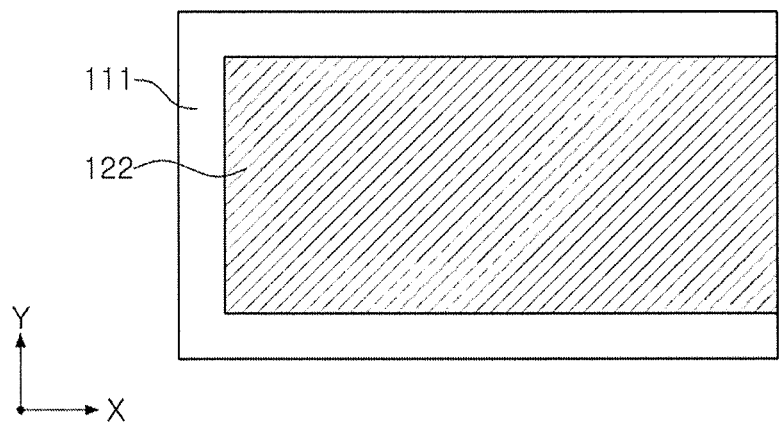

FIG. 3 is a perspective view schematically illustrating a body of a first multilayer capacitor configuring the laminate of FIG. 1, FIG. 4 is a perspective view schematically illustrating formation of external electrodes on the body of FIG. 3, FIG. 5 is a cross-sectional view taken along line I-I' of FIG. 4, and FIGS. 6A and 6B are plan views illustrating structures of the first and second internal electrodes included in the body of FIG. 3, respectively.

Referring to FIGS. 3 through 6B, the first multilayer capacitor 100 may include a body 110 and first and second electrodes 131 and 132.

The body 110 may be formed by stacking the plurality of dielectric layers 111 in the Z direction, followed by sintering, and may include the plurality of dielectric layers 111 and first and second internal electrodes 121 and 122 alternately disposed in the Z direction with each dielectric layer 111 interposed therebetween.

In addition, covers 112 and 113 having a predetermined thickness may be formed, respectively, on both surfaces of the body 110 in the Z direction.

Here, adjacent dielectric layers 111 of the body 110 may be integrated with each other so that boundaries therebetween are not readily apparent without a scanning electron microscope (SEM).

In addition, the body 110 is not specifically limited in view of a shape, and for example, may have a hexahedral shape.

In the present exemplary embodiment, for convenience of explanation, both surfaces of the body 110 opposing each other in the Z direction are defined as first and second surfaces 1 and 2, both surfaces of the body 110 connected to the first and second surfaces 1 and 2 and opposing each other in the X direction are defined as third and fourth surfaces 3 and 4, and both surfaces of the body 110 connected to the first and second surfaces 1 and 2 and connected to the third and fourth surfaces 3 and 4 and opposing each other in the Y direction are defined as fifth and sixth surfaces 5 and 6, respectively. In the present exemplary embodiment, the first surface 1 may be a surface facing a mounting direction.

Further, in the first multilayer capacitor 100 of the present exemplary embodiment, a thickness, a width, and the like may be adjusted in consideration of a size of a finally completed laminate. For example, in the case of the laminate of an exemplary embodiment to be described later, the laminate is formed by stacking three multilayer capacitors in the Z direction, such that when the laminate is considered to have the same size as that of a single multilayer capacitor according to the related art, the first multilayer capacitor 100 according to the present exemplary embodiment may be manufactured to have a thickness corresponding to ⅓ of the thickness of the single multilayer capacitor according to the related art.

The dielectric layer 111 may include a ceramic material having a high dielectric constant, for example, barium titanate ($BaTiO_3$)-based ceramic powder, or the like, but is not limited thereto as long as a sufficient capacitance may be obtained.

Further, in addition to the ceramic powder, the dielectric layer 111 may further include a ceramic additive, an organic solvent, a plasticizer, a binder, a dispersant, or the like. As the ceramic additive, for example, a transition metal oxide or carbide, a rare earth element, magnesium (Mg), aluminum (Al), or the like, may be used.

The first and second internal electrodes 121 and 122, which are electrodes having different polarities, may be alternately disposed so as to face each other in the Z direction with a ceramic sheet forming the dielectric layer 111 interposed therebetween, and each one end of the first and second internal electrodes may be exposed through the third and fourth surfaces 3 and 4 of the body 110.

Here, the first and second internal electrodes 121 and 122 may be electrically insulated from each other by the dielectric layer 111 interposed therebetween.

In addition, the first and second internal electrodes 121 and 122 may be formed of a conductive metal, for example, one of silver (Ag), palladium (Pd), platinum (Pt), nickel (Ni), and copper (Cu), an alloy thereof, or the like, but are not limited thereto.

Further, the first and second internal electrodes 121 and 122 may be formed by printing a conductive paste on a ceramic sheet in which the dielectric layer 111 is formed. Here, the printing may be screen printing, gravure printing, or the like, and is not limited thereto.

According to the configuration as described above, when predetermined voltages are applied to the first and second external electrodes 131 and 132, electric charges may be accumulated between the first and second internal electrodes 121 and 122 facing each other.

Here, a capacitance of the first multilayer capacitor 100 may be in proportion to an area of an overlapping portion in which the first and second internal electrodes 121 and 122 are overlapped with each other in the Z direction.

The first and second external electrodes 131 and 132 may be provided with voltages having different polarities, and may be formed, respectively, on the third and fourth surfaces 3 and 4 of the body 110 in the X direction to be electrically connected to portions in which the first and second internal electrodes 121 and 122 are exposed, respectively.

Here, the first and second external electrodes 131 and 132 may not have a band portion. If the band portion is formed on one surface of the first, second, fifth, and sixth surfaces of the body 110, a lift may occur when the plurality of multilayer capacitors are vertically or horizontally attached, causing product defects.

The first and second external electrodes 131 and 132 may be formed of a conductive metal, and the conductive metal may include, for example, at least one of silver (Ag), copper (Cu), gold (Au), nickel (Ni), and chromium (Cr).

Figure 7:
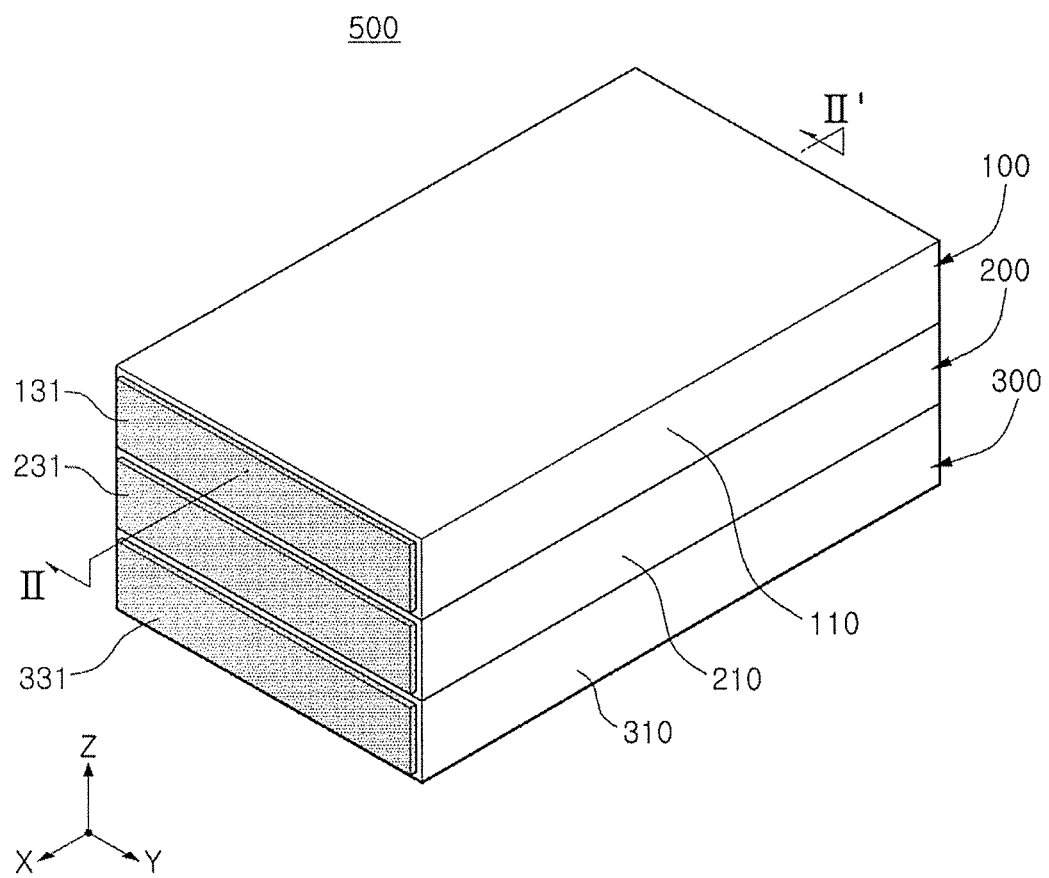
FIG. 7 is a perspective view schematically illustrating a laminate in which first to third multilayer capacitors are stacked in a Z direction.
Figure 8:
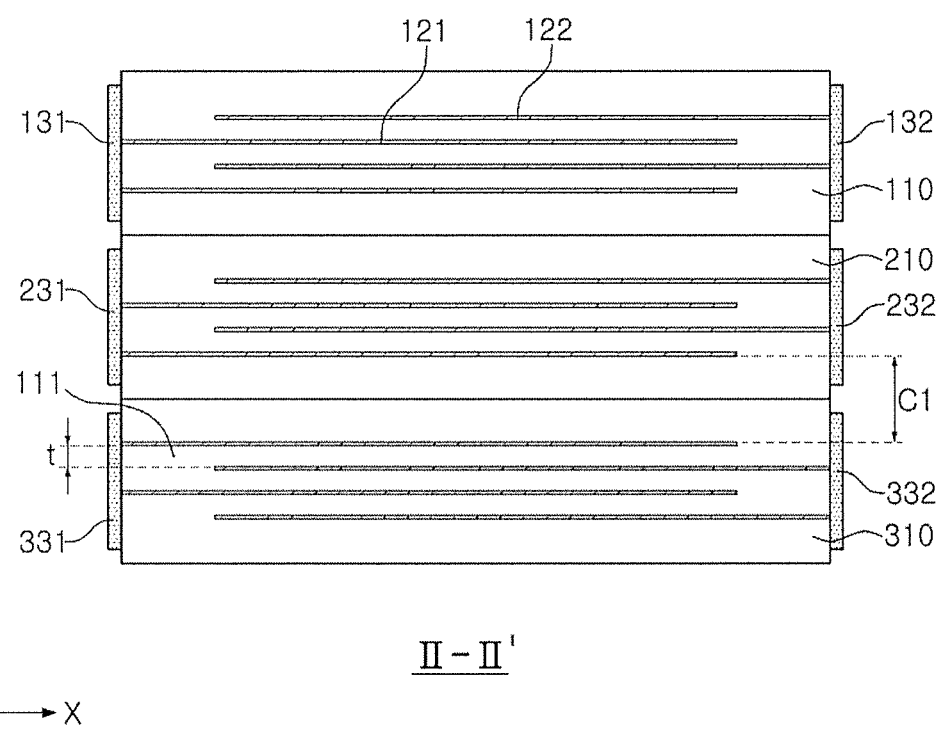
FIG. 8 is a cross-sectional view taken along II-II' of FIG. 7.

FIG. 7 is a perspective view schematically illustrating a laminate in which first to third multilayer capacitors are stacked in the Z direction, and FIG. 8 is a cross-sectional view taken along II-II' of FIG. 7.

Referring to FIG. 7, the laminate 500 of the present exemplary embodiment may be formed by stacking the body 110 of the first multilayer capacitor 100 as described above and bodies 210 and 310 of second and third multilayer capacitors 200 and 300 each having a similar structure to the body 110 of the first multilayer capacitor 100 in the Z direction.

Referring to FIG. 8 and FIGS. 1 and 2, in the laminate 500 configured as described above, a first terminal 410 covering a plurality of first external electrodes 131, 231 and 331, and a second terminal 420 covering a plurality of second external electrodes 132, 232 and 332 may be formed.

The first and second terminals 410 and 420 may be formed of a conductive metal, and the conductive metal may include, for example, at least one of silver (Ag), copper (Cu), gold (Au), nickel (Ni), and chromium (Cr).

The first terminal 410 may include a first connection portion 410a and a first band portion 410b.

The first connection portion 410a may be formed on the third surface of the laminate 500 in the X direction, and may be electrically connected to the plurality of first external electrodes 131, 231, and 331 at the same time.

The first band portion 410b may extend from the first connection portion 410a to a portion of the first and second surfaces of the laminate 500 in the Z direction and a portion of the fifth and sixth surfaces of the laminate 500 in the Y direction.

The first band portion 410b may improve bonding strength of the first terminal 410 and a portion formed on the first surface of the laminate 500 in the first band portion 410b may serve as a mounting portion.

The second terminal 420 may include a second connection portion 420a and a second band portion 420b.

The second connection portion 420a may be formed on the fourth surface of the laminate 500 in the X direction, and may be electrically connected to the plurality of second external electrodes 132, 232, and 332 at the same time.

The second band portion 420b may extend from the second connection portion 420a to a portion of the first and second surfaces of the laminate 500 in the Z direction and a portion of the fifth and sixth surfaces of the laminate 500 in the Y direction.

The second band portion 420b may improve bonding strength of the second terminal 420 and a portion formed on the first surface of the laminate 500 in the second band portion 420b may serve as a mounting portion.

In addition, the first and second terminals 410 and 420 may include a plating layer formed on a surface to increase the bonding strength when the capacitor is mounted on a board by solder.

For example, the plating layer may include a nickel plating layer and a tin plating layer formed on the nickel plating layer.

Further, in the present exemplary embodiment, $30 \times t \leq C1 \leq 100 \times t$ in which t is a thickness of the dielectric layer 111, and C1 is the sum of thicknesses of an upper cover region and a lower cover region adjacent to each other in the bodies 210 and 310 of the second and third multilayer capacitors 200 and 300 disposed on upper and lower sides.

When the C1 is less than $30 \times t$, the thicknesses of the upper and lower covers configuring the bodies of the respective multilayer capacitors become excessively thin, crack may easily occur and defect may occur due to deformation of the internal electrodes, causing an increase in a defect rate.

When the C1 is more than $100 \times t$, the thicknesses of the upper and lower covers configuring the bodies of the respective multilayer capacitors may excessively increase, resulting in an excessively large capacitor size, such that it may be difficult to implement a target capacitance at a desired size.

When a multilayer capacitor having a large size is manufactured by a ceramic sheet having a small thickness, uniformity of the sheet and the internal electrodes may be deteriorated, and it may be difficult to remove a binder in plasticization, and the like, such that there may be problems in that the defect rate of a final product may be increased and capacitance dispersion may be widened.

According to the present exemplary embodiment, a single laminate may be formed by connecting a plurality of small-sized multilayer capacitors each having a small capacitance as a sintered body to be adhered in the vertical direction or in the horizontal direction, such that the multilayer electronic component having a capacity similar to that of a large-size multilayer capacitor having a large capacitance may be provided.

Further, in the present exemplary embodiment, since the laminate may be formed by sintering the bodies of the respective multilayer capacitors, forming the external electrodes, and adhering the bodies and the external electrodes in a state that measurement is completed, it may be advantageous in an increase in yield, and the terminal may be finally formed in the laminate to complete the multilayer electronic component in one component form, such that the multilayer electronic component may be mounted on a board in the same manner as the single multilayer capacitor according to the related art.

In addition, in the present exemplary embodiment, the laminate having a desired form may be manufactured by stacking the multilayer capacitors as many as required by adjusting a size, a capacitance, the number, or the like, of the multilayer capacitors so as to correspond to the size and capacity of the finally completed multilayer electronic component, such that the multilayer electronic component may be easily implemented in various characteristics and forms as desired by the user.

Figure 9:
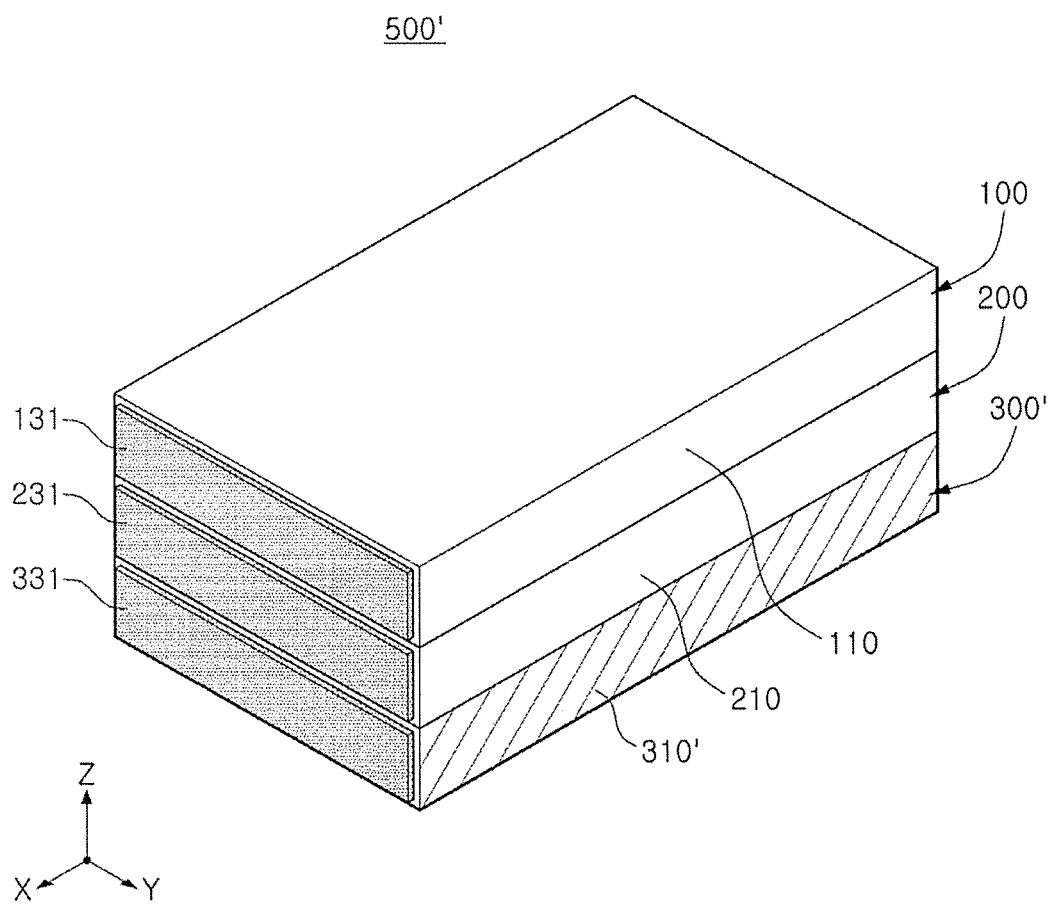
FIG. 9 is a perspective view illustrating another exemplary embodiment of the laminate of the present disclosure.

Meanwhile, as shown in FIG. 9, the third multilayer capacitor 300' disposed on the lowermost layer of the laminate 500' may be formed to have a lower capacitance than the first and second multilayer capacitors 100 and 200 disposed on an upper side of the laminate 500'.

To this end, the body 310' of the third multilayer capacitor 300' disposed on the lowermost layer of the laminate 500' may be formed of a material having a dielectric constant smaller than that of the bodies 110 and 210 of the first and second multilayer capacitors 100 and 200 disposed on the upper side of the laminate 500'.

As another example, the body 310' of the third multilayer capacitor 300' disposed on the lowermost layer of the laminate 500' may be configured so that the number of stacked internal electrodes is smaller than that of the bodies 110 and 210 of the first and second multilayer capacitors 100 and 200 disposed on the upper side of the laminate 500'.

When the capacitance of the third multilayer capacitor 300' disposed on the lowermost layer of the laminate 500' is smaller than that of the first and second multilayer capacitors 100 and 200 disposed on the upper side of the laminate 500', acoustic noise may be reduced when the capacitor is mounted on a board.

Figure 10:
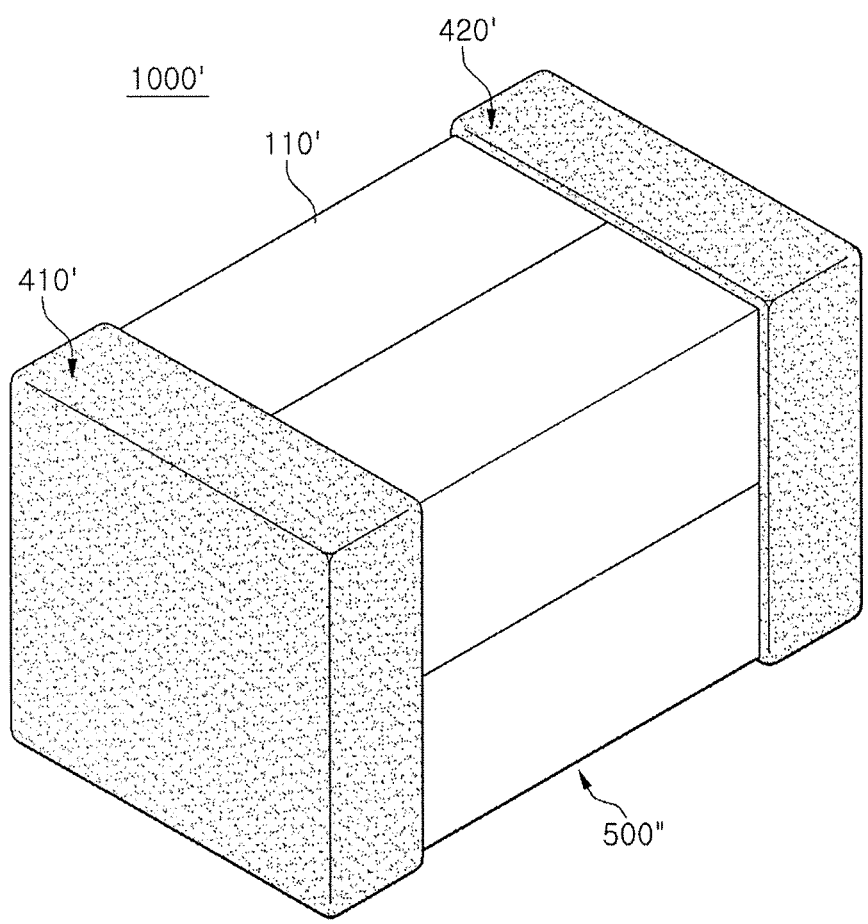
FIG. 10 is a perspective view schematically illustrating a multilayer electronic component according to another exemplary embodiment in the present disclosure.
Figure 11:
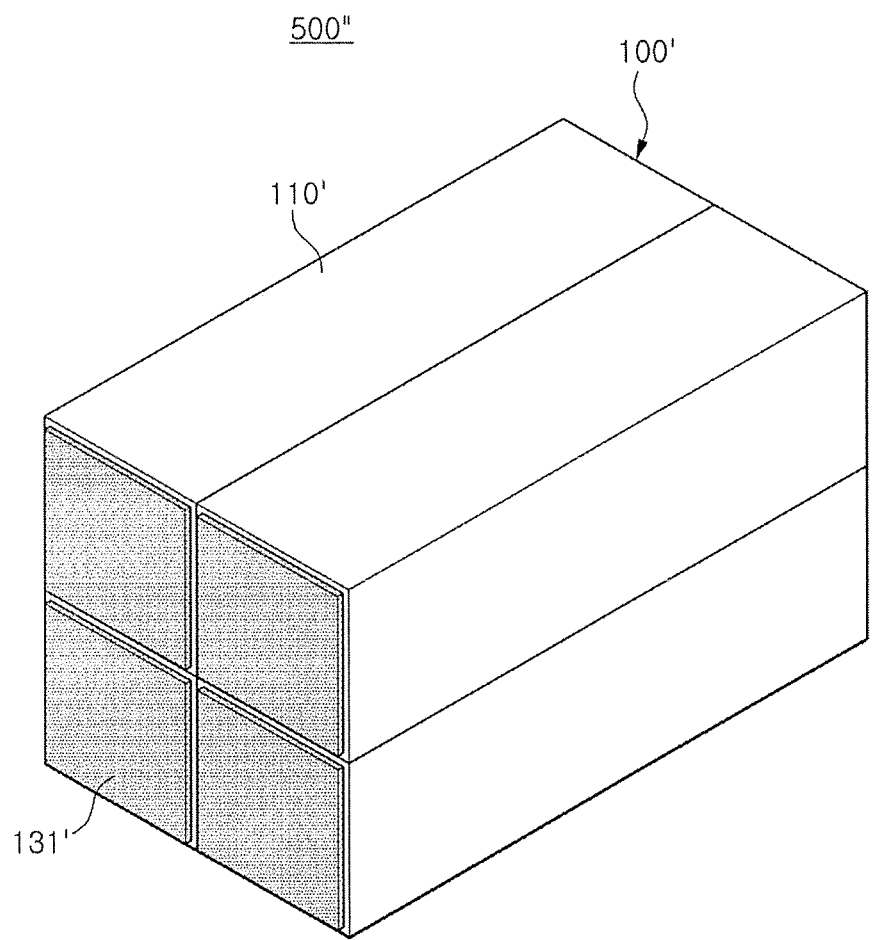
FIG. 11 is a perspective view in which terminals are omitted from FIG. 10.
Figure 12:
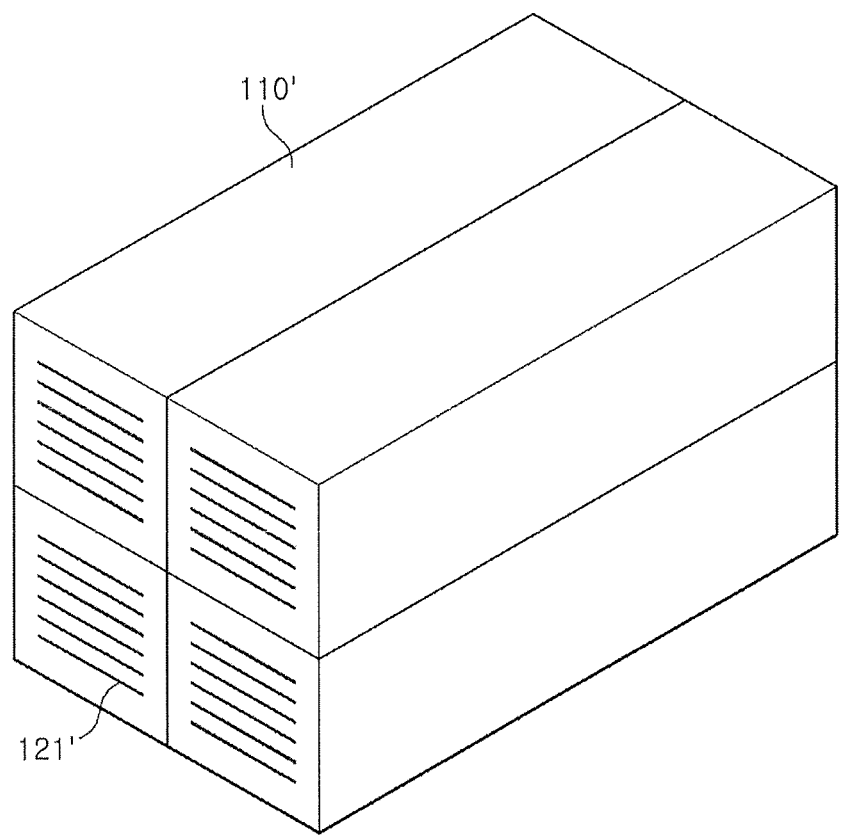
FIG. 12 is a perspective view in which external electrodes are omitted from FIG. 11.

FIG. 10 is a perspective view schematically illustrating a multilayer electronic component according to another exemplary embodiment in the present disclosure, FIG. 11 is a perspective view in which terminals are omitted from FIG. 10, and FIG. 12 is a perspective view in which external electrodes are omitted from FIG. 11.

Referring to FIGS. 10 through 12, in the multilayer electronic device 1000' of the present exemplary embodiment, the laminate 500'' may be formed by disposing the bodies 110' of the plurality of multilayer capacitors 100' in parallel with each other in the Y direction, which is a horizontal direction. Here, reference numeral 131' denotes the first external electrode, and reference numeral 121' denotes the first internal electrode.

Further, in the present exemplary embodiment, the laminate 500'' may be formed by disposing the plurality of multilayer capacitors 100' in parallel with each other in the Y direction while stacking the plurality of multilayer capacitors 100' in the Z direction, which is a vertical direction. However, if necessary, the laminate may be formed by disposing the plurality of multilayer capacitors in parallel with each other only in the Y direction.

Further, in the present disclosure, the laminate may be formed by using a total of four multilayer capacitors. However, the number of multilayer capacitors configuring the laminate is not limited thereto, and the laminate of the present disclosure may have five or more multilayer capacitors or two multilayer capacitors.

As set forth above, according to exemplary embodiments in the present disclosure, the multilayer electronic component having a large capacity may be provided by connecting the plurality of multilayer capacitors to each other to form a laminate.

While the present disclosure has been shown and described in connection with the embodiments, it will be apparent to those skilled in the art that modifications and variations can be made without departing from the spirit and scope of the disclosure as defined by the appended claims.

What is claimed is:

1. A multilayer electronic component comprising:
a laminate having a plurality of multilayer capacitors disposed to be adjacent to each other, each of the plurality of multilayer capacitors including a body including dielectric layers and first and second internal electrodes alternately exposed through two end surfaces of the body facing each other in a length direction with each of the dielectric layers interposed therebetween in a thickness direction, and first and second external electrodes disposed on the two end surfaces of the body in the length direction, respectively; and
first and second terminals disposed on the laminate to cover a plurality of first and second external electrodes, respectively,
wherein the first and second terminals respectively include first and second connection portions disposed on two end surfaces of the laminate in the length direction, and first and second band portions extending from circumferential edges of the first and second connection portions to cover at least a portion of top and bottom surfaces of the laminate in the thickness direction,
wherein circumferential edges of the first and second external electrodes are arranged within circumferential edges of the two end surfaces of the body in the thickness direction, respectively, and
wherein a surface of a multilayer capacitor of the plurality of multilayer capacitors directly contacts a surface of an adjacent multilayer capacitor of the plurality of multilayer capacitors.

2. The multilayer electronic component of claim 1, wherein the laminate includes the plurality of multilayer capacitors arranged in parallel in a horizontal direction.

3. The multilayer electronic component of claim 1, wherein the laminate includes the plurality of multilayer capacitors stacked in the thickness direction.

4. The multilayer electronic component of claim 3, wherein a first multilayer capacitor disposed on a lowermost layer of the laminate has a lower capacitance than a second multilayer capacitor disposed on an upper side of the laminate.

5. The multilayer electronic component of claim 3, wherein a first body of a first multilayer capacitor disposed on a lowermost layer of the laminate is formed of a material having a dielectric constant smaller than that of a second body of a second multilayer capacitor disposed on an upper side of the laminate.

6. The multilayer electronic component of claim 3, wherein a first body of a first multilayer capacitor disposed on a lowermost layer of the laminate is configured so that the number of stacked internal electrodes in the first body is smaller than that of a second body of a second multilayer capacitor disposed on an upper side of the laminate.

7. The multilayer electronic component of claim 3, wherein $30 \times t \leq C1 \leq 100 \times t$ in which t is a thickness of each of the dielectric layers, and C1 is the sum of thicknesses of two adjacent cover regions of two adjacent multilayer capacitors of the laminate, wherein each of the two adjacent multilayer capacitors includes two cover regions respectively disposed on upper and lower sides thereof.

8. The multilayer electronic component of claim 1, wherein each of the first and second band portions covers a portion of front and rear surfaces of the laminate in a width direction.

9. The multilayer electronic component of claim 1, wherein the laminate includes the plurality of multilayer capacitors arranged in parallel in a horizontal direction and stacked in a vertical direction at the same time.

10. The multilayer electronic component of claim 9, wherein a first multilayer capacitor disposed on a lowermost layer of the laminate has a lower capacitance than a second multilayer capacitor disposed on an upper side of the laminate.

11. The multilayer electronic component of claim 9, wherein a first body of a first multilayer capacitor disposed on a lowermost layer of the laminate is formed of a material having a dielectric constant smaller than that of a second body of a second multilayer capacitor disposed on an upper side of the laminate.

12. The multilayer electronic component of claim 9, wherein a first body of a first multilayer capacitor disposed on a lowermost layer of the laminate is configured so that the number of stacked internal electrodes in the first body is smaller than that of a second body of a second multilayer capacitor disposed on an upper side of the laminate.

13. The multilayer electronic component of claim 9, wherein $30 \times t \leq C1 \leq 100 \times t$ in which t is a thickness of each of the dielectric layers, and C1 is the sum of thicknesses of two adjacent cover regions of two adjacent multilayer capacitors of the laminate, wherein each of the two adjacent multilayer capacitors includes two cover regions respectively disposed on upper and lower sides thereof.

14. The multilayer electronic component of claim 1, wherein the bodies of the multilayer capacitor and the adjacent multilayer capacitor of the plurality of multilayer capacitors are discrete.

* * * * *